(«12») United States Patent
Meissner et al.

(10) Patent No.: US 10,065,857 B2
(45) Date of Patent: Sep. 4, 2018

(54) SYSTEMS AND METHODS FOR GENERATING CARBON DIOXIDE FOR USE AS A REFORMING OXIDANT IN MAKING SYNGAS OR REFORMED GAS

(71) Applicants: David C. Meissner, Charlotte, NC (US); Matthew C. Stubbing, Charlotte, NC (US); Gary E. Metius, Charlotte, NC (US)

(72) Inventors: David C. Meissner, Charlotte, NC (US); Matthew C. Stubbing, Charlotte, NC (US); Gary E. Metius, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 0 days.

(21) Appl. No.: 14/195,521

(22) Filed: Mar. 3, 2014

(65) Prior Publication Data

US 2014/0264177 A1 Sep. 18, 2014

Related U.S. Application Data

(60) Provisional application No. 61/777,264, filed on Mar. 12, 2013.

(51) Int. Cl.
*C01B 3/38* (2006.01)
*C21B 13/02* (2006.01)

(52) U.S. Cl.
CPC ............. *C01B 3/382* (2013.01); *C01B 3/384* (2013.01); *C21B 13/02* (2013.01); *C21B 13/026* (2013.01);
(Continued)

(58) Field of Classification Search
CPC .................................................... C01B 3/382
See application file for complete search history.

(56) References Cited

U.S. PATENT DOCUMENTS 3,844,766 A 10/1974 Beggs
3,945,944 A 3/1976 Kang
(Continued)

FOREIGN PATENT DOCUMENTS

WO WO2009037587 A2 3/2009
WO 2012158178 A1 11/2012

OTHER PUBLICATIONS

Ullah et al.; Has DRI's Time for Wider Acceptance Come?; Apr. 1991 Ironmaking Conference Proceedings, vol. 50, pp. 777-788 (published contemporaneously). Available on ProQuest-CSA at http://www.csa.com/partners/viewrecords.php?requester=gs&collection=TRD&recid=199207420606MD.
(Continued)

*Primary Examiner* — Paul A Wartalowicz
(74) *Attorney, Agent, or Firm* — Clements Bernard Walker PLLC; Christopher L. Bernard

(57) ABSTRACT

Processes that generate syngas or reformed gas that have the desired H2/CO ratio, such that they can be used directly for producing higher value liquids, such as using a FT GTL process. The systems and methods of the present invention are simpler and more cost effective than conventional systems and methods. The systems and methods of the present invention generate the required CO2 in a reforming furnace by combusting natural gas with a mixture of O2 from an external source and CO2 that is recirculated from a reforming furnace. A second application of the natural gas combustion with external O2 mixed with recirculated CO2 in the reformer burners can be utilized in a DR process. The reformed gas or syngas containing H2 and CO is used to reduce iron oxide to metallic iron in a shaft furnace, for example.

7 Claims, 2 Drawing Sheets

(52) U.S. Cl.
CPC ............ *C01B 2203/0233* (2013.01); *C01B 2203/0238* (2013.01); *C01B 2203/0811* (2013.01); *C01B 2203/141* (2013.01); *Y02P 10/132* (2015.11); *Y02P 10/136* (2015.11); *Y02P 10/143* (2015.11); *Y02P 20/129* (2015.11)

(56) References Cited

U.S. PATENT DOCUMENTS

| | | |
|---|---|---|
| 4,047,935 A | 9/1977 | Barnhart |
| 4,062,529 A | 12/1977 | Altenhoner et al. |
| 4,156,659 A | 5/1979 | Barnhart |
| 4,216,011 A | 8/1980 | Martinez-Vera et al. |
| 4,336,063 A | 6/1982 | Guzman-Bofill et al. |
| 4,363,654 A | 12/1982 | Frederick et al. |
| 4,370,162 A | 1/1983 | Dominquez-Ahado et al. |
| 4,428,772 A | 1/1984 | Dominguez-Ahedo et al. |
| 4,529,440 A | 7/1985 | Jordan |
| 4,537,626 A | 8/1985 | Pfeiffer et al. |
| 4,553,742 A | 11/1985 | Summers et al. |
| 4,584,016 A | 4/1986 | Becerra-Novoa et al. |
| 4,591,380 A | 5/1986 | Summers et al. |
| 4,685,964 A | 8/1987 | Summers et al. |
| 4,734,128 A | 3/1988 | Becerra-Novoa et al. |
| 4,756,750 A | 7/1988 | Bixler et al. |
| 4,834,792 A | 5/1989 | Becerra-Novoa |
| 4,861,351 A * | 8/1989 | Nicholas ............ B01D 53/0476 95/101 |
| 4,880,458 A | 11/1989 | Martinez-Vera et al. |
| 4,880,459 A | 11/1989 | Coyne |
| 4,897,113 A | 1/1990 | Becerra-Novoa et al. |
| 4,900,356 A | 2/1990 | Hoffman |
| 5,064,467 A | 11/1991 | Dam et al. |
| 5,078,787 A | 1/1992 | Becerra-Novoa et al. |
| 5,082,251 A | 1/1992 | Whipp |
| 5,437,706 A | 8/1995 | Edelson |
| 5,437,708 A | 8/1995 | Meissner et al. |
| 5,445,363 A | 8/1995 | Becerra-Novoa et al. |
| 5,582,029 A | 12/1996 | Occhialini et al. |
| 5,618,032 A | 4/1997 | Meissner et al. |
| 5,676,732 A | 10/1997 | Viramontes-Brown et al. |
| 5,752,995 A | 5/1998 | Kang |
| 5,833,734 A | 11/1998 | Cip et al. |
| 5,858,057 A | 1/1999 | Celada-Gonzalez et al. |
| 5,882,579 A | 3/1999 | Viramontes-Brown et al. |
| 5,958,107 A | 9/1999 | Greenwalt |
| 6,027,545 A | 2/2000 | Villareal-Trevino |
| 6,033,456 A | 3/2000 | Jahnke |
| 6,039,916 A | 3/2000 | Celada-Gonzalez et al. |
| 6,045,602 A | 4/2000 | Shah et al. |
| 6,149,859 A | 11/2000 | Jahnke et al. |
| 6,197,088 B1 | 3/2001 | Greenwalt |
| 6,353,133 B1 | 3/2002 | Thiebaut et al. |
| 6,562,103 B2 | 5/2003 | Sethna et al. |
| 6,696,501 B2 | 2/2004 | Schanke et al. |
| 6,986,800 B2 | 1/2006 | Duarte-Escareno et al. |
| 8,496,908 B1 * | 7/2013 | Genkin ............ B01D 53/047 423/437.1 |
| 2002/0050097 A1 | 5/2002 | Fournier et al. |
| 2003/0047037 A1 | 3/2003 | Sethna et al. |
| 2003/0047038 A1 * | 3/2003 | Iwasaki et al. ............ 75/707 |
| 2003/0134911 A1 | 7/2003 | Schanke et al. |
| 2004/0209131 A1 * | 10/2004 | Bolton ............ C01B 3/323 429/412 |
| 2004/0248999 A1 * | 12/2004 | Briscoe ............ C01B 3/384 518/703 |
| 2007/0238906 A1 | 10/2007 | Brown et al. |
| 2007/0245855 A1 | 10/2007 | Zendejas-Martinez |
| 2008/0319093 A1 | 12/2008 | Olah et al. |
| 2010/0113624 A1 * | 5/2010 | Routier ............ 518/702 |
| 2010/0162852 A1 | 7/2010 | Becerra-Novoa et al. |
| 2010/0264374 A1 * | 10/2010 | Metius et al. ............ 252/373 |
| 2011/0247457 A1 | 10/2011 | Knop et al. |
| 2011/0284800 A1 * | 11/2011 | Millner ............ 252/373 |
| 2012/0067059 A1 | 3/2012 | Katz et al. |
| 2012/0114533 A1 * | 5/2012 | Crouch et al. ............ 422/240 |

OTHER PUBLICATIONS

Aug. 15, 2014 International Search Report issued in International Patent Application No. PCT/US14/22945.

* cited by examiner

SYSTEMS AND METHODS FOR GENERATING CARBON DIOXIDE FOR USE AS A REFORMING OXIDANT IN MAKING SYNGAS OR REFORMED GAS

CROSS-REFERENCE TO RELATED APPLICATION

The present patent application/patent claims the benefit of priority of co-pending U.S. Provisional Patent Application No. 61/777,264, filed on Mar. 12, 2013, and entitled "SYSTEMS AND METHODS FOR GENERATING CARBON DIOXIDE FOR USE AS A REFORMING OXIDANT IN MAKING SYNGAS OR REFORMED GAS," the contents of which are incorporated in full by reference herein.

FIELD OF THE INVENTION

The present invention relates generally to Fischer Tropsch (FT) gas-to-liquid (GTL) and direct reduction (DR) applications. More specifically, the present invention relates to systems and methods for generating carbon dioxide ($CO_2$) for use as a reforming oxidant in making synthesis gas (syngas) or reformed gas.

BACKGROUND OF THE INVENTION

It is desirable to find improved ways to supply syngas, which consists primarily of hydrogen ($H_2$) and carbon monoxide (CO), to a downstream processing plant, such as a FT GTL plant or the like, which converts the syngas into higher value liquid products, such as diesel fuel and gasoline in the case of a FT GTL plant. One way to generate syngas is to reform natural gas with an oxidant. Reforming the methane in the natural gas with steam produces a gas with a $H_2$/CO ratio of about 3. However, the required $H_2$/CO ratio in the syngas for a GTL conversion is about 2 or less. In order to achieve this lower $H_2$/CO ratio, it is necessary to reform with $CO_2$ in addition to the steam or water vapor. The $CO_2$ can be obtained via purchase through a pipeline, if available. The $CO_2$ can also be captured from the flue gas of a reforming furnace (reformer), but this is a rather costly means for obtaining the amount required.

The problem of generating a syngas with a $H_2$/CO ratio of about 2 or less is currently solved using an "autothermal reforming" process, using steam and oxygen ($O_2$) as the oxidants, or by reforming methane with steam and then removing part of the $H_2$ by pressure swing absorption (PSA) to reduce the $H_2$/CO ratio from about 3 down to about 2. Both of these processes are unnecessarily complex and expensive. Thus, improved processes are still needed in the art, and are provided by the present invention.

BRIEF SUMMARY OF THE INVENTION

The object of the present invention is to provide processes that generate syngas or reformed gas that have the desired $H_2$/CO ratio, such that they can be used directly for producing higher value liquids, such as using a FT GTL process. The systems and methods of the present invention are simpler and more cost effective than conventional systems and methods. The systems and methods of the present invention generate the required $CO_2$ in a reforming furnace by combusting natural gas with a mixture of $O_2$ from an external source and $CO_2$ that is recirculated from a reforming furnace. The combustion of $O_2$ with natural gas produces $CO_2$ and water ($H_2O$). The $CO_2$ that accompanies the $O_2$ acts as an inert constituent and coolant, and is continually recirculated from the reforming furnace to a heat exchanger, then to a direct contact water scrubber or the like, which condenses most of the water. From the scrubber, the high-$CO_2$ gas is split into two streams. The first stream flows to a compressor, where it is compressed to about 2-4 barg. From there, the first stream is then mixed with steam and natural gas, and is sent as a process gas to reformer tubes where the $CO_2$ and $H_2O$ reform the methane and small amounts of other hydrocarbons to $H_2$ and CO. The second stream, which is typically a much higher flow, is compressed in a blower to about 0.5 barg. From there, the high-$CO_2$ gas is mixed with $O_2$ from an external source, and is sent to reformer burners where it combusts the natural gas and produces $CO_2$ and $H_2O$.

It is desirable that the following conditions are met. First, the high-$CO_2$ gas sent to the reformer as an oxidant should have the lowest nitrogen ($N_2$) content possible, as it will end up in the syngas or reformed gas. The $N_2$ is an inert constituent and is viewed as a negative by the syngas processor. Second, the amount of external $O_2$ should be minimized, as producing $O_2$ is costly. These two conditions can be met by operating the reforming process with two separate reformers. The first reformer is operated with natural gas going to the reformer burners to be combusted with the $CO_2$ and $O_2$ mixture. This reformer is sized to produce the required $CO_2$, which is subsequently used as a reforming oxidant in both reformers. There is essentially no flue gas exhausted to the atmosphere from this reformer. The second reformer is operated with a fuel mixture of natural gas and/or tail gas from the FT GTL plant. The tail gas from the FT GTL plant typically has a higher $N_2$ content than the natural gas used in the FT GTL plant. The natural gas and/or tail gas is combusted with preheated air, instead of external $O_2$, which makes the $O_2$ plant smaller in size. The flue gas from this reformer contains $N_2$, $CO_2$, and $H_2O$, and is exhausted to the atmosphere. The same mixture of process gas as in the first reformer is sent to the second reformer, where it is reformed and produces the reformed gas, which is then mixed with the reformed gas from the first reformer. The reformed gas from both reformers then flows to a heat recovery system for raising steam and preheating natural gas. The cooled syngas or reformed gas can be further treated (compressed, desulfurized, etc.) for delivery to the syngas processor.

A second application of the natural gas combustion with external $O_2$ mixed with recirculated $CO_2$ in the reformer burners can be utilized in a DR process. Here, the reformed gas or syngas containing $H_2$ and CO is used to reduce iron oxide to metallic iron in a shaft furnace, for example. The shaft furnace offgas is cooled and compressed, and recycled to the reformer as process gas, which reforms methane and small amounts of other hydrocarbons in catalyst-filled tubes in the reformer, and to the burners, where it is mixed with natural gas and combusted with the $O_2$/$CO_2$ oxidant. The burners supply the heat to the reforming reaction in the tubes. The carbon atoms must leave the system in the flue gas from the reformer combustion system (except for a minor amount as carbon in the direct reduced iron (DRI)). Typically, with an air-fired combustion system, the flue gas contains about 11% $CO_2$ and about 68% $N_2$, with the balance being water vapor. The $CO_2$ in this flue gas is very costly to recover using $CO_2$ removal systems, such as amines or hot potassium carbonate. By using $O_2$ from an external source with the $CO_2$ coolant in the combustion system, the flue gas is essentially all $CO_2$ after water vapor condensation. This high-$CO_2$ gas can be sold as industrial $CO_2$, or can be sequestered, depending on the carbon taxes or penalties in the area of operation.

In one exemplary embodiment, the present invention provides a process for generating syngas or reformed gas that comprises a desired $H_2/CO$ ratio, such that the syngas or reformed gas can be used directly in a Fischer Tropsch gas-to-liquid process or the like, comprising: generating $CO_2$ in a reforming furnace by combusting natural gas with a mixture of $O_2$ from an external source and $CO_2$ that is recirculated from a reforming furnace; wherein the combustion of $O_2$ and natural gas produces $CO_2$ and $H_2O$; splitting the high-$CO_2$ gas into two streams; wherein the first stream is compressed, and then is mixed with steam and natural gas and is sent as a process gas to reformer tubes where the $CO_2$ and $H_2O$ reform the natural gas to $H_2$ and CO; wherein the second stream is compressed, and then is mixed with $O_2$ from an external source, and then is sent to reformer burners where it combusts the natural gas and produces $CO_2$ and $H_2O$. The $CO_2$ that accompanies the $O_2$ acts as an inert constituent and coolant, and is continually recirculated from the reforming furnace to a heat exchanger, then to a scrubber that condenses a majority of the water. The first stream is compressed to about 2-4 barg. The second stream is compressed to about 0.5 barg. Optionally, the process also comprises operating the reforming process with two separate reformers. The first reformer is operated with the natural gas going to the reformer burners to be combusted with the $CO_2$ and $O_2$ mixture and is sized to produce the required $CO_2$, which is subsequently used as a reforming oxidant in both reformers. The second reformer is operated with a fuel mixture of the natural gas and/or tail gas from a Fischer Tropsch gas-to-liquid plant, wherein the natural gas and/or tail gas is combusted with preheated air, wherein the same mixture of process gas as in the first reformer is sent to the second reformer, and wherein it is reformed and produces the reformed gas, which is then mixed with the reformed gas from the first reformer. The reformed gas from both reformers flows to a heat recovery system for raising steam and preheating the natural gas. The cooled syngas or reformed gas is treated for delivery to a syngas processor.

In another exemplary embodiment, the present invention provides a direct reduction process incorporating natural gas combustion with external $O_2$ mixed with recirculated $CO_2$ in reformer burners, comprising: recycling cooled and compressed shaft furnace offgas to a reformer as process gas, which reforms methane and other hydrocarbons in catalyst-filled tubes disposed within the reformer, and to burners, where it is mixed with natural gas and combusted with an $O_2/CO_2$ oxidant; wherein carbon atoms leave in reformer flue gas, except for a minor amount as carbon in direct reduced iron; wherein, using $O_2$ from an external source with $CO_2$ coolant, the flue gas is essentially all $CO_2$ after water vapor condensation.

BRIEF DESCRIPTION OF THE DRAWINGS

The present invention is illustrated and described herein with reference to the various drawings, in which like reference numbers are used to denote like system components/method steps, as appropriate, and in which:

FIG. 2 is a process flow sheet illustrating one exemplary embodiment of the generation of a high-$CO_2$ flue gas for a DR application or the like.

DETAILED DESCRIPTION OF THE INVENTION

Figure 1:
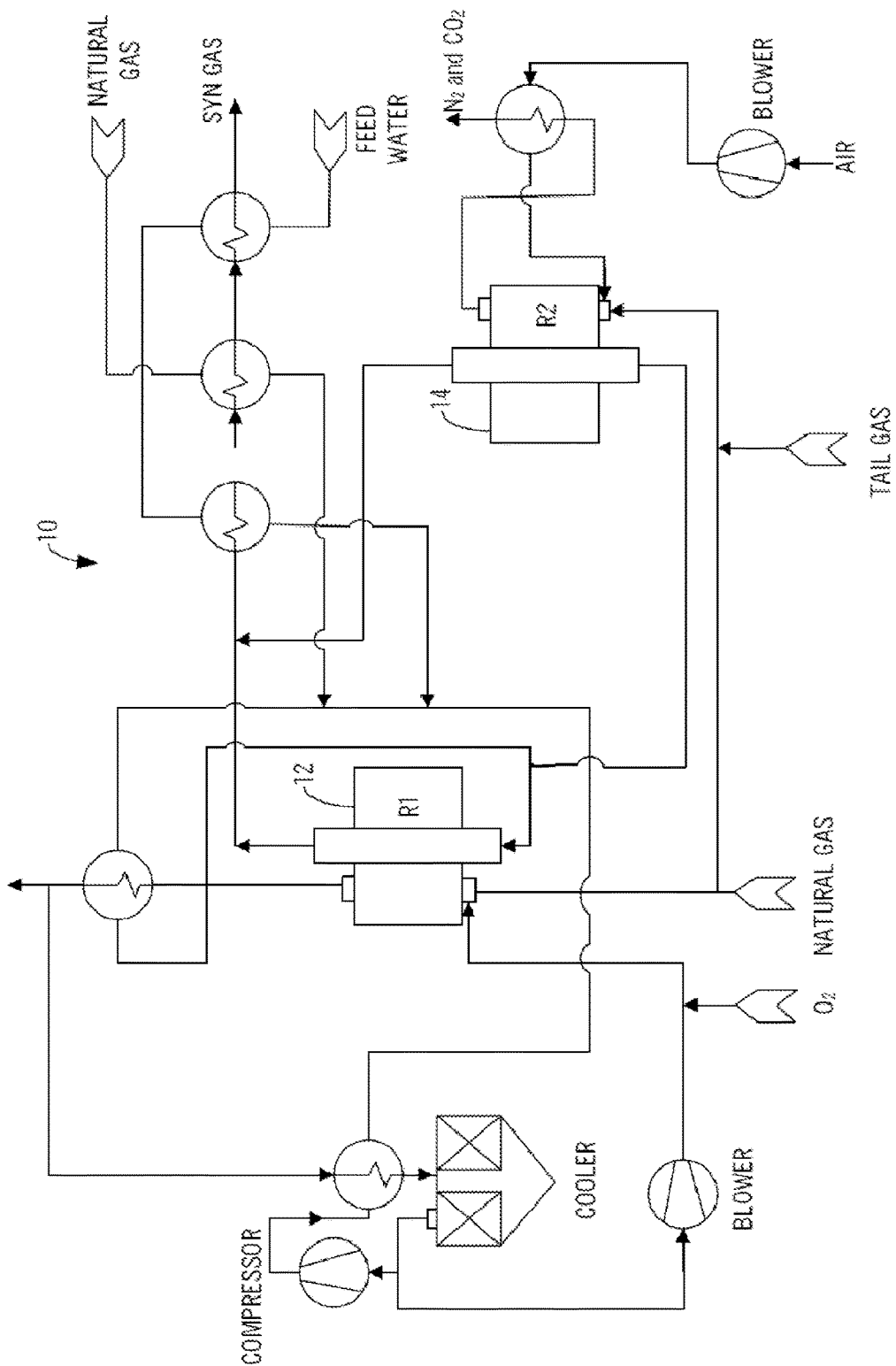
FIG. 1 is a process flow sheet illustrating one exemplary embodiment of the minimization of $O_2$ usage for the generation of $CO_2$ for use in the subsequent reforming of natural gas for the generation of syngas.

Again, the object of the present invention is to provide processes that generate syngas or reformed gas that have the desired $H_2/CO$ ratio, such that they can be used directly for producing higher value liquids, such as using a FT GTL process. The systems and methods of the present invention are simpler and more cost effective than conventional systems and methods. The systems and methods of the present invention generate the required $CO_2$ in a reforming furnace by combusting natural gas with a mixture of $O_2$ from an external source and $CO_2$ that is recirculated from a reforming furnace. The combustion of $O_2$ with natural gas produces $CO_2$ and water ($H_2O$). The $CO_2$ that accompanies the $O_2$ acts as an inert constituent and coolant, and is continually recirculated from the reforming furnace to a heat exchanger, then to a direct contact water scrubber or the like, which condenses most of the water. From the scrubber, the high-$CO_2$ gas is split into two streams. The first stream flows to a compressor, where it is compressed to about 2-4 barg. From there, the first stream is then mixed with steam and natural gas, and is sent as a process gas to reformer tubes where the $CO_2$ and $H_2O$ reform the methane and small amounts of other hydrocarbons to $H_2$ and CO. The second stream, which is typically a much higher flow, is compressed in a blower to about 0.5 barg. From there, the high-$CO_2$ gas is mixed with $O_2$ from an external source, and is sent to reformer burners where it combusts the natural gas and produces $CO_2$ and $H_2O$.

It is desirable that the following conditions are met. First, the high-$CO_2$ gas sent to the reformer as an oxidant should have the lowest nitrogen ($N_2$) content possible, as it will end up in the syngas or reformed gas. The $N_2$ is an inert constituent and is viewed as a negative by the syngas processor. Second, the amount of external $O_2$ should be minimized, as producing $O_2$ is costly. These two conditions can be met by operating the reforming process with two separate reformers. The first reformer is operated with natural gas going to the reformer burners to be combusted with the $CO_2$ and $O_2$ mixture. This reformer is sized to produce the required $CO_2$, which is subsequently used as a reforming oxidant in both reformers. There is essentially no flue gas exhausted to the atmosphere from this reformer. The second reformer is operated with a fuel mixture of natural gas and/or tail gas from the FT GTL plant. The tail gas from the FT GTL plant typically has a higher $N_2$ content than the natural gas used in the FT GTL plant. The natural gas and/or tail gas is combusted with preheated air, instead of external $O_2$, which makes the $O_2$ plant smaller in size. The flue gas from this reformer contains $N_2$, $CO_2$, and $H_2O$, and is exhausted to the atmosphere. The same mixture of process gas as in the first reformer is sent to the second reformer, where it is reformed and produces the reformed gas, which is then mixed with the reformed gas from the first reformer. The reformed gas from both reformers then flows to a heat recovery system for raising steam and preheating natural gas. The cooled syngas or reformed gas can be further treated (compressed, desulfurized, etc.) for delivery to the syngas processor.

A second application of the natural gas combustion with external $O_2$ mixed with recirculated $CO_2$ in the reformer burners can be utilized in a DR process. Here, the reformed gas or syngas containing H2 and CO is used to reduce iron oxide to metallic iron in a shaft furnace, for example. The shaft furnace offgas is cooled and compressed, and recycled to the reformer as process gas, which reforms methane and small amounts of other hydrocarbons in catalyst-filled tubes in the reformer, and to the burners, where it is mixed with natural gas and combusted with the O2/CO2 oxidant. The burners supply the heat to the reforming reaction in the tubes. The carbon atoms must leave the system in the flue gas from the reformer combustion system (except for a minor amount as carbon in the direct reduced iron (DRI)). Typically, with an air-fired combustion system, the flue gas contains about 11% CO2 and about 68% N2, with the balance being water vapor. The CO2 in this flue gas is very costly to recover using CO2 removal systems, such as amines or hot potassium carbonate. By using O2 from an external source with the CO2 coolant in the combustion system, the flue gas is essentially all CO2 after water vapor condensation. This high-CO2 gas can be sold as industrial CO2, or can be sequestered, depending on the carbon taxes or penalties in the area of operation.

Referring now specifically to FIG. 1, a two reformer embodiment 10 is illustrated. Reformer I 12 uses the O2 and CO2 oxidant in the reformer burners, where the lower N2-content natural gas is combusted. The flue gas from reformer I 12 is recirculated, cooled, and split into two streams, which are then compressed and sent to the process gas for reforming and sent to the burners for mixing with O2 that then combusts the natural gas. Reformer I 12 and reformer II 14 each receive part of the process gas containing CO2, steam, and natural gas. The process gas is sent to the catalyst-filled tubes in reformer I 12 and reformer II 14 for generating reformed gas, which is then mixed together to form the reformed gas or syngas. The CO2-generation requirement sets the size of reformer I 12, such that only the required amount of CO2 is generated by the O2/CO2 combustion of natural gas. In this exemplary embodiment, about 57% of the reformed gas is generated in reformer I 12 and about 43% of the reformed gas is generated in reformer II 14. Both reformers are operated at essentially the same temperature and pressure.

In another exemplary embodiment, the natural gas used to make the reformed gas or syngas contains a low N2 content, and, thus, the tail gas coming back from the GTL or liquid plant contains a low N2 content. If additional CO2 is required for sale to industrial users, or CO2 sequestration is desired, one larger reformer with O2/CO2 burners and a CO2 recirculating system can be installed, such that the CO2 not being used in the process gas as an oxidant can be exported as very high-CO2 gas.

Figure 2:
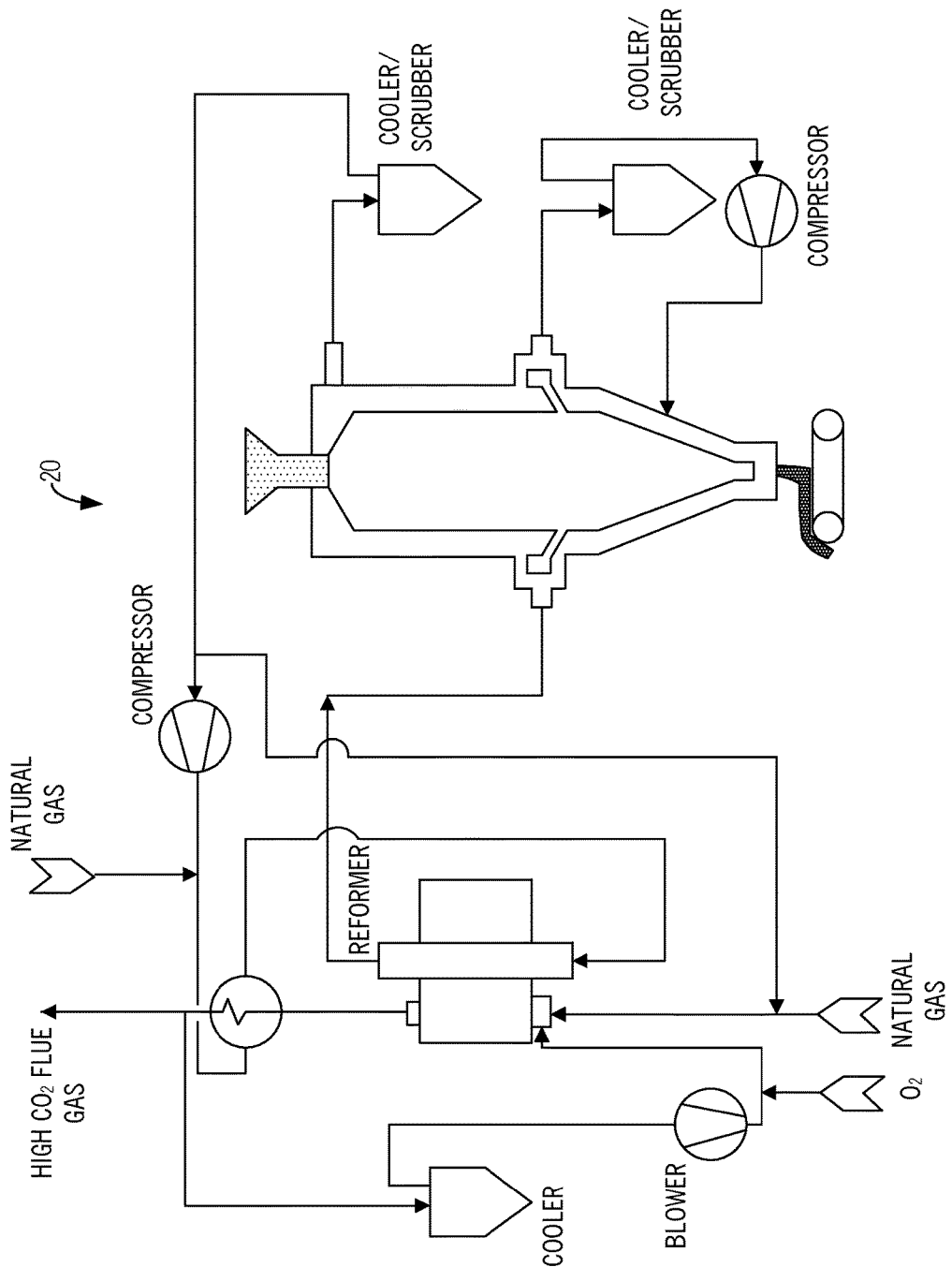

Referring now specifically to FIG. 2, in an embodiment 20 involving the direct reduction of iron oxides, for example, a fairly typical flowsheet is utilized, except that the reformer burners are fired with an O2/CO2 mixture to combust a natural gas/top gas fuel mixture and the majority of the high-CO2 flue gas is recirculated to the burners after cooling and compression. Essentially, all of the carbon entering the system (except for a small amount of carbon in the DRI) is exported in the flue gas, which is a high-CO2 gas. This high-CO2 gas can be sold as industrial CO2, or can be sequestered, depending on the carbon taxes or penalties in the area of operation.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A process for generating syngas or reformed gas that comprises a desired H2/CO ratio, comprising:
    generating CO2 in a reforming furnace by combusting natural gas with a mixture of O2 from an external source and cooled recirculated CO2 from the reforming furnace;
    wherein the combustion of the O2 and the natural gas produces CO2 and H2O;
    splitting the produced CO2 into two streams;
    wherein a first produced CO2 stream is compressed, and then is mixed with steam and additional natural gas and is sent as a process gas to reformer tubes in the reforming furnace where the produced CO2 of the first produced CO2 stream and H2O forming the steam reform the additional natural gas to H2 and CO;
    wherein a second produced CO2 stream having a greater flow than the first produced CO2 stream is compressed, mixed with the O2 from the external source, and sent to reformer burners in the reforming furnace where the natural gas is combusted to produce the CO2 and H2O; and
    wherein a H2/CO ratio of the syngas or reformed gas derived from the reformer tubes in the reforming furnace is 2 or less and the syngas or reformed gas is used directly in a Fischer-Tropsch gas-to-liquid process.

2. The process of claim 1, wherein the cooled recirculated CO2 is continually recirculated from the reforming furnace to a heat exchanger, then to a scrubber that condenses a majority of the water.

3. The process of claim 1, wherein the first produced CO2 stream is compressed to about 2-4 barg.

4. The process of claim 1, wherein the second produced CO2 stream is compressed to about 0.5 barg.

5. The process of claim 1, wherein cooled syngas or reformed gas is treated for delivery to a syngas processor.

6. The process of claim 1, wherein a portion of the generated CO2 is delivered to and utilized in an additional reformer.

7. The process of claim 1, wherein a portion of the cooled recirculated CO2 is received from an additional reformer.

* * * * *